United States Patent
Dulaney et al.

(10) Patent No.: US 6,566,629 B1
(45) Date of Patent: May 20, 2003

(54) HIDDEN SURFACE LASER SHOCK PROCESSING

(75) Inventors: Jeffrey L. Dulaney, Dublin, OH (US); Allan H. Clauer, Worthington, OH (US); Steven M. Toller, Dublin, OH (US); Craig T. Walters, Powell, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/307,117

(22) Filed: May 7, 1999

Related U.S. Application Data

(63) Continuation-in-part of application No. 08/806,094, filed on Feb. 25, 1997, now Pat. No. 6,002,102.

(51) Int. Cl.$^7$ .............................................. B23K 26/00
(52) U.S. Cl. ............................ 219/121.74; 219/121.85
(58) Field of Search ..................... 219/121.74, 121.85, 219/121.68, 121.69

(56) References Cited

U.S. PATENT DOCUMENTS

| | | | |
|---|---|---|---|
| 3,803,379 A | * 4/1974 | McRay ..................... | 219/121.6 |
| 4,303,137 A | 12/1981 | Fischer | |
| 4,475,027 A | * 10/1984 | Pressley .................. | 219/121.6 |
| 4,476,374 A | * 10/1984 | Saggese ................. | 219/121.74 |
| 4,885,751 A | 12/1989 | Terreur | |
| 5,131,957 A | * 7/1992 | Epstein et al. .......... | 219/121.85 |
| 5,160,556 A | * 11/1992 | Hyde et al. .............. | 219/121.6 |
| 5,225,650 A | 7/1993 | Babel et al. | |
| 5,371,767 A | * 12/1994 | Pirl ....................... | 219/121.63 |
| 5,525,429 A | 6/1996 | Mannava et al. | |
| 5,571,575 A | * 11/1996 | Takayanagi | |
| 5,601,737 A | 2/1997 | Asahi et al. | |
| 5,719,376 A | 2/1998 | Snyder et al. | |
| 5,846,054 A | * 12/1998 | Mannava et al. | |
| 6,002,102 A | * 12/1999 | Dulaney et al. ........ | 219/121.85 |

FOREIGN PATENT DOCUMENTS

| | | | |
|---|---|---|---|
| EP | 0 416 988 A1 | 9/1990 | |
| JP | 62-5715 | * 2/1987 | ............ 219/121.74 |
| JP | 2-19421 | 1/1990 | |
| JP | 2-30393 | * 1/1990 | |
| JP | 3-184686 | * 8/1991 | ............ 219/121.74 |
| JP | 5-337672 | 12/1993 | |
| JP | 6-45295 | 2/1994 | |
| JP | 7-51941 | 2/1995 | |
| JP | 07-246483 | 9/1995 | |

* cited by examiner

Primary Examiner—Geoffrey S. Evans
(74) Attorney, Agent, or Firm—Randall J. Knuth

(57) ABSTRACT

A laser processing method for processing a hidden surface of a workpiece, the hidden surface being disposed within a recess having an opening. The method includes inserting a reflective member into the recess and directing a pulse of coherent energy to reflect off of said reflective member and impact the hidden surface of a workpiece to create a shock wave. Alteratively a surface of the recess may be modified to laser shock process the hidden surface. In one particular embodiment, the reflective member is specifically shaped to provide diction of a pulse of coherent energy to a hidden surface so that a substantially uniform energy density is applied to the hidden surface. In an additional embodiment, the method is optimized for preventing damage to the reflective member. In one particular embodiment, the reflective member is composed of a fluid.

45 Claims, 6 Drawing Sheets

HIDDEN SURFACE LASER SHOCK PROCESSING

This is a continuation-in-part of Ser. No. 08/806,094, filed Feb. 25, 1997, now U.S. Pat. No. 6,002,102.

BACKGROUND OF THE INVENTION

1. Field of the Invention

The present invention relates to the use of coherent energy pulses, as from high power pulsed lasers, in the shock processing of solid materials, and, more particularly, to methods for improving properties of solid materials by providing shock waves therein where the laser beam impacts the solid material on a hidden surface. The invention is especially useful for enhancing or creating desired physical properties such as hardness, strength, and fatigue strength.

2. Description of the Related Art

Known methods for shock processing of solid materials, particularly laser shock processing solid materials, typically using coherent energy as from a laser, orient the laser beam normal, i.e., perpendicular to the workpiece.

When particular constraints of processing are created, based on the shape of the material or other geometric factors such as when attempting to laser shock harden integrally bladed rotors (IBR's), blind bores, slots, or dovetail sections, the laser beam may not have a direct, line of sight access to the area to be shock processed.

Laser shock processing techniques and equipment can be found in the U.S. Pat. No. 5,131,957 to Epstein, along with that of U.S. patent application Ser. No. 08/547,012 entitled LASER PEENING PROCESS AND APPARATUS, assigned to the assignee of the present invention and hereby incorporated by reference.

Known laser shock processing systems tend to form a relatively small, in cross sectional area, laser beam impacting on the surface of the workpiece. This is because a sufficient laser energy must be applied over a particular area to sufficiently work a surface of the workpiece. The smaller the area with the same amount of energy leads to a greater energy per unit area application. The more energy per unit area applied, the deeper the residual compressive stresses are applied to the workpiece.

Laser shock processing of hidden surfaces would benefit particular types and areas of workpieces if such could be accomplished.

One disadvantage in the art of laser shock peening is the failure to teach laser shock processing of hidden surfaces. The current state of the art of laser shock processing contains limitations which prevent effective hidden surface laser shock peening. One limitation which has prevented effective laser shock peening of hidden surfaces is that a pulse of coherent energy may damage a reflective member used to direct a pulse of coherent energy to a hidden surface. The energy density of a pulse of coherent energy necessary to effectively process a workpiece in order to impart deep compressive residual stresses will normally exceed the damage tolerances of a reflective member. This is because the reflective member must necessarily be placed near the target surface due to space constraints near a hidden surface. As a result, prior to this invention, attempting to use a reflective member to redirect a beam of coherent energy to a hidden surface for laser shock peening resulted in damage or destruction of the reflective member due to the converging beam's decreasing cross-section as it nears the workpiece surface.

A second limitation in the art of laser shock peening which prevents hidden surface laser shock peening is that a non-uniform energy density may be applied to the hidden surface of a workpiece. This is especially an issue when the hidden surface is contoured. For example, the hidden surface could be contoured such that part of the workpiece surface is closer to the last focusing optic of a laser source. The energy density of a beam of coherent energy varies as the distance from the last laser focusing optic increases. This is because the laser beam is converging after the last focusing optic. The shape and design of the last focusing optic affect how the laser beam energy density will vary as a function of distance from the last laser focusing optic. Using current optics in the art of laser shock processing results in the portion of the workpiece contour surface which is closer to the last focusing optic, to be impacted with a pulse of coherent energy having a different energy density than the contour section which is further away from the last laser focusing optic. Consequently, the energy density applied to a hidden surface would be non-uniform.

Another limitation in the art which prevents effective laser shock peening of hidden workpiece surfaces is inconsistently imparted compressive residual stresses over the area processed. For example, when the energy applied to a workpiece surface varies in energy density, the result is non-uniform or inconsistent compressive residual stresses imparted to the workpiece. A consequence of non-uniform compressive residual stresses imparted in a workpiece is the need to reprocess the workpiece with more overlapping laser shock processing spots. As a consequence of either having to reprocess the same spot or providing more overlap of spots, there is an increase in processing time and cost. Moreover, the result of applying a non-uniform energy density across the spot to be processed results in creation of an unpredictable compressive residual stress profile. In addition, non-uniform energy density application to a workpiece results in a less effective and less efficient use of the pulse of energy.

What is needed in the art is a way to modify the laser beam to consistently and uniformly work hidden areas of the workpiece.

SUMMARY OF THE INVENTION

The present invention provides a method of laser shock peening that can be used in a production environment to apply laser shock processing treatment to hidden surfaces once thought not applicable for treatment.

The present invention includes use of a reflective member inserted into a recess of the workpiece. The reflective member is created to reflect an inbound laser beam to the hidden surface within the workpiece. Different geometries and forms of the reflective member are given, some dependent on the shape of the recess.

The term recess as used in this application is that of an opening, port, hole, channel, or other space within the workpiece. The term hidden surface as used in this application is an interior surface of the workpiece, not normally available for direct line-of-sight laser processing. Typical recesses with hidden surfaces include, the interior surfaces that define holes and blind bores, the interior roof of dovetail slots as can be found in aircraft gas turbine disks, and other similar openings and ports in workpieces.

The invention, in one form thereof, is a laser peening method for processing a hidden surface of a workpiece. The hidden surface is disposed within a recess having an opening. The laser peening method comprises the steps of inserting a reflective member into the recess. Means are provided for preventing damage to the reflective member. A pulse of coherent energy is directed to reflect off of the reflective member and impact the hidden surface of the workpiece to create a shock wave.

In one embodiment, the reflective member is a focusing mirror. In an alternate embodiment, the means for preventing damage to the reflective member comprises providing a gap between a transparent overlay applied to the workpiece and the reflective member. In an alternate embodiment, means for preventing damage to the reflective member comprises providing the pulse of coherent energy at a minimum energy density when reaching the reflective member and an operational energy density when the pulse impacts the workpiece.

In one specific further embodiment, the reflective member is a flow of fluid flowing along the length of a recess having an opening, such as a dovetail shape. The laser processing beam would be incident on the flow of fluid and would be reflected to the workpiece hidden surface by refraction and total internal reflection in the fluid flow.

The invention, in another form thereof, is a laser peening method for processing a hidden surface of a workpiece. The hidden surface is disposed within a recess having an opening. The laser peening method comprises the steps of inserting a reflective member having a geometry into the recess. The reflective member geometry is determined such that when a pulse of coherent energy reflects off of the reflective member, the pulse will impact the workpiece surface with a substantially uniform energy density being applied to the workpiece surface. A pulse of coherent energy is directed to reflect off of the reflective member and impact the hidden surface of the workpiece to create a shock wave therein. In one particular embodiment, the hidden surface has a contour. In a further, alternate embodiment, the recess is dovetail shaped.

The invention, in yet another form thereof, is a laser shock peening method for processing a workpiece. A reflective member is formed from a fluid. A pulse of coherent energy is directed to reflect off of the reflective member and impact the workpiece to create compressive residual stresses therein.

The invention, in another form thereof, is a laser peening apparatus for improving properties of a workpiece by providing shock waves therein. An energy absorbing overlay is applied to the workpiece. A laser generates a laser beam which is operatively associated with the energy absorbing overlay to create a shock wave on the workpiece. A reflective member is composed of fluid and is operatively associated with the laser generator. In a further embodiment, a high speed nozzle forms the reflective member.

An advantage of the present invention is that hidden surfaces of a workpiece may now be effectively laser shock processed.

Another advantage of the present invention is the application of a pulse of coherent energy to a workpiece having a contoured surface in which the energy applied to the workpiece surface is substantially uniform throughout the processed spot. The advantage of uniformly applying energy across a process spot provides for consistent imparting of compressive residual stresses to a workpiece. In addition, more predictable compressive residual stresses may be applied to a workpiece. In turn, fatigue life, hardness, and strength may be enhanced as compared with the application of a non-uniformly applied energy density to the workpiece.

Another advantage is that the hidden surfaces may be laser shock processed in a production environment.

A further advantage of the present invention is the ability to precisely control the laser beam inside the workpiece.

Yet another advantage of the present invention is that by applying lower powered laser energy through a majority of the opening of the recess, the energy per unit area remains small, reducing negative effects, until reflected and focused by the reflective member. Such lower power-density laser beam use, spread out over the recess opening, but later focused to the power density necessary for laser shock processing, increases the effectiveness, and possibly the operational lifetime, of the reflective member or reflective surface.

Yet another advantage of the present invention is the prevention of plasma formation on the reflective member, for example, a focusing mirror.

A further advantage of the present invention is that, in one embodiment, the reflective member is continuously renewed. When the reflective member is composed of a fluid, the reflective member will not suffer the damage limitations of conventional reflective members. Consequently, there is no need to replace or repair the reflective member between successive laser shock peening cycles. Therefore, the speed by which one can laser shock peen a workpiece is not limited by having to replace the reflective member.

An additional advantage of using a fluid reflective member is the ability to modify the reflective optic properties of the reflective member. By varying the flow of fluid and the fluid shape, the shape of the reflective member is altered. Altering the shape of a reflective member will consequently change the reflective characteristics of the reflective member. By changing the geometry of the reflective member, one is able to modify the energy density of a beam of coherent energy applied to a workpiece and the location on the workpiece to be processed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The improvements in fatigue life produced by laser shock processing are the results of residual compressive stresses developed in the irradiated surface that retard fatigue crack initiation and/or slowing of crack propagation. Changes in the shape of a crack front and slowing of the crack growth rate when the crack front encounters the laser shocked zone have been shown. Laser shock processing is an effective method of increasing fatigue life in metals by treating fatigue critical regions. For a more through background and the prior history of laser shock processing and high powered processing of engineered materials, reference can be made to U.S. Pat. No. 5,131,957. This patent shows the type of laser and laser circuit adaptable for use with the present invention. Another type of laser adaptable for use with the invention, is that with a ND-Glass Laser manufactured by LSP Technologies, of Dublin, Ohio. Normally, the laser beam pulse is around 20 ns.

Figure 1:
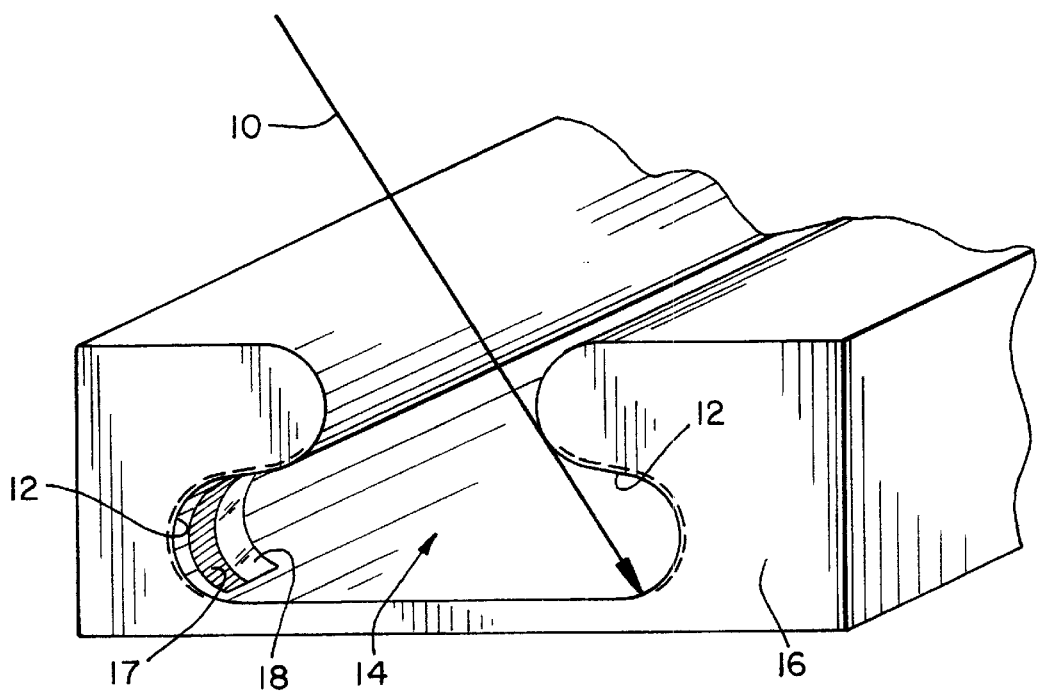
FIG. 1 is a sectional perspective view of a workpiece having a hidden surface to a laser beam from conventional laser shock processing.

The present invention solves the problem as shown in FIG. 1 in which a laser beam 10 provided from a laser shock processing system is unable to access and process hidden surfaces 12 disposed in recess 14 of workpiece 16. Although the examples of this application use a dovetail-shaped recess in the circumference of a disk and a blind bore, numerous other geometries are possible that create such a hidden surface 12 either partially or completely not in direct line-of-sight with the outer surface of workpiece 14.

Overlays are applied to the surface of the target workpiece being laser shock processed. These overlay materials may be of two types, one transparent to laser radiation, and the other, opaque to laser radiation. They may be used alone or in combination with one another, but is preferable that they be used in combination with an opaque layer adjacent to the workpiece and the outer transparent layer being adjacent to the opaque layer. For example, opaque overlay 17 and transparent overlay 18 are applied to workpiece 16 along hidden surfaces 12. A laser beam 10 is directed through transparent overlay 18 and is absorbed by opaque layer 17.

During laser shock peening, the laser beam 10 is absorbed by opaque layer 17, which is quickly vaporized, producing a plasma. The plasma is confined by the transparent overlay 18 resulting in a pressure pulse applied to workpiece 16. The pressure pulse creates a shock wave within workpiece 16, which imparts deep compressive residual stresses within workpiece 16.

The method of the invention provides for either inserting a reflective member 20 within the recess to alter the path of the laser beam 10 (a coherent pulse of energy), or modifying an inner surface of recess 14 to then reflect such laser beam 10. Such reflected laser beam is caused to impact hidden surface 12, thereby laser shock peening the surface. After such processing, the workpiece can be further machined and manufactured for instance into an aircraft gas turbine engine disk.

Figure 2:
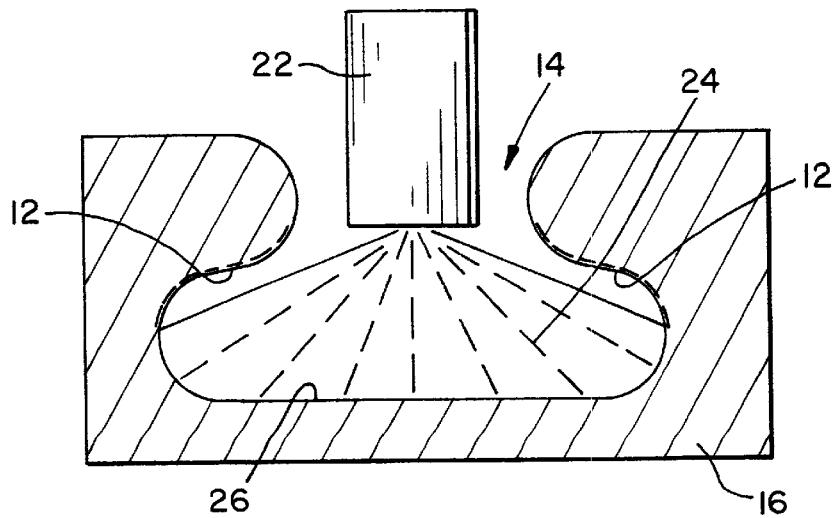
FIG. 2 is a sectional view of a workpiece during application of a reflective coating on an inner surface.

FIG. 2 shows the second method in which an applicator head 22 is spraying a reflective coating 24 such as metal paint, silver coat, or another highly reflective coating or paint, at least in the frequency range of laser beam 10. Other types of coatings may equivalently be used as long as an incident laser beam 10 entering recess 14 will be reflected toward hidden surface 12. Laser processing hidden surface 12 is then simply a matter of applying laser energy at correct angle to impact the intended portion of hidden surface 12.

Additionally and equivalently, it may be possible, with some types of workpieces, especially those made from highly reflective stainless steels, to simply polish the inner bottom surface 26 to create the necessary reflective surface.

Figure 3:
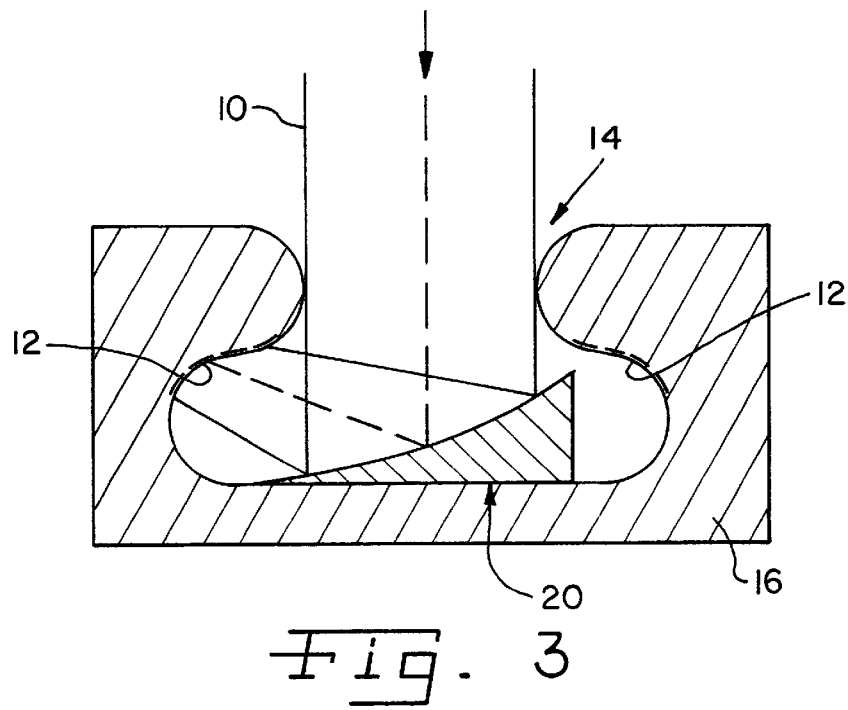
FIG. 3 is a sectional view of a workpiece having a reflective element disposed with the recess focussing an incoming laser beam to the hidden surface.

FIG. 3 shows a reflective member 20 inserted into recess 14. Reflective member 20 may be formed from almost any material found to withstand the pressures created by laser shock peening. A requirement is that member 20 have some type of reflective coating thereon, such as silver, gold or copper, or integrally formed by member 20 itself.

Preferably member 20 would be constructed in long, flexible strips such that during processing such member could be quickly indexed through recess 14 during the laser shock process. Additionally, such member could be constructed to be disposable after use or heavily constructed so that after use only a sacrificial coating of reflective member 20 has been destroyed. Such a member 20 could then be recycled and equipped with a new reflective surface for use with the method once more.

As shown in FIG. 3, reflective member may take the form of a metal focusing mirror to focus incoming laser beam 10 to particular portions of hidden surface 12. Numerous geometries of reflective member 20 may be used, since there are numerous geometries of recesses and hidden surfaces.

The geometry of the reflective member is specifically determined depending on the workpiece surface to be laser shock peened. Specifically, the reflective member geometry is such that when a pulse of coherent energy reflects off of the reflective member, the pulse of coherent energy impacts the workpiece surface with a substantially uniform energy density being applied to the workpiece surface. Factors which affect the necessary reflective member geometry include the contour or curvature of the hidden surface and the angle of the workpiece hidden surface relative to the incident angle of the laser beam.

One factor which affects the desired shape of the reflective member to apply a substantially uniform energy across the spot to be processed on a workpiece, is the curvature of the workpiece surface. Depending on the contour of a hidden surface, part of the hidden surface may be closer to the last focusing optic while another part of the hidden surface is further from the last focusing optic.

One particular embodiment of the present invention is directed to providing a substantially uniform energy pulse over the area on a workpiece to be processed by laser shock peening regardless of the shape or contour of the workpiece.

In its simplest form, the contour of the reflective surface of the reflective member may have a contour in the cross-section plane of FIG. 3 which is substantially a parabola with axis parallel to the incoming beam axis, but offset a distance in the direction of the surface to be processed by an amount greater than the distance from the beam axis to the furthest portion of the surface to be processed. The parabola constants and this axis separation distance must be selected to provide the correct beam width on the surface to be processed such that the energy density will be sufficient for laser shock processing of the workpiece surface. Additionally, the contour may have the form of higher polynomials or special numerically derived curves, which would produce the additional benefit of a substantially uniform energy density on the workpiece surface. The curves so derived would be unique to each workpiece configuration and would account for the size of the incident beam, the size of the opening in the workpiece, the curvature of the surface to be processed, and the distance of the surface to be processed from the reflective member. The derivation procedure consists of mapping the energy incident on finite element segments of a trial mirror surface to finite element segments on the workpiece surface. Mirror segment widths and inclination angles are chosen to produce substantially uniform energy density on the workpiece surface segments accounting for workpiece surface segment distance and inclination angle. The reflecting member curve is then set by taking smaller and smaller finite element segment sizes or fitting the center locations of the segments to a smooth curve by interpolation, or both.

As a result of determining the reflective member geometry, one is now able to laser shock process workpieces having hidden surfaces which may be contoured. For example, such workpieces now include dove-tail slot-recessed workpieces.

Figure 4:
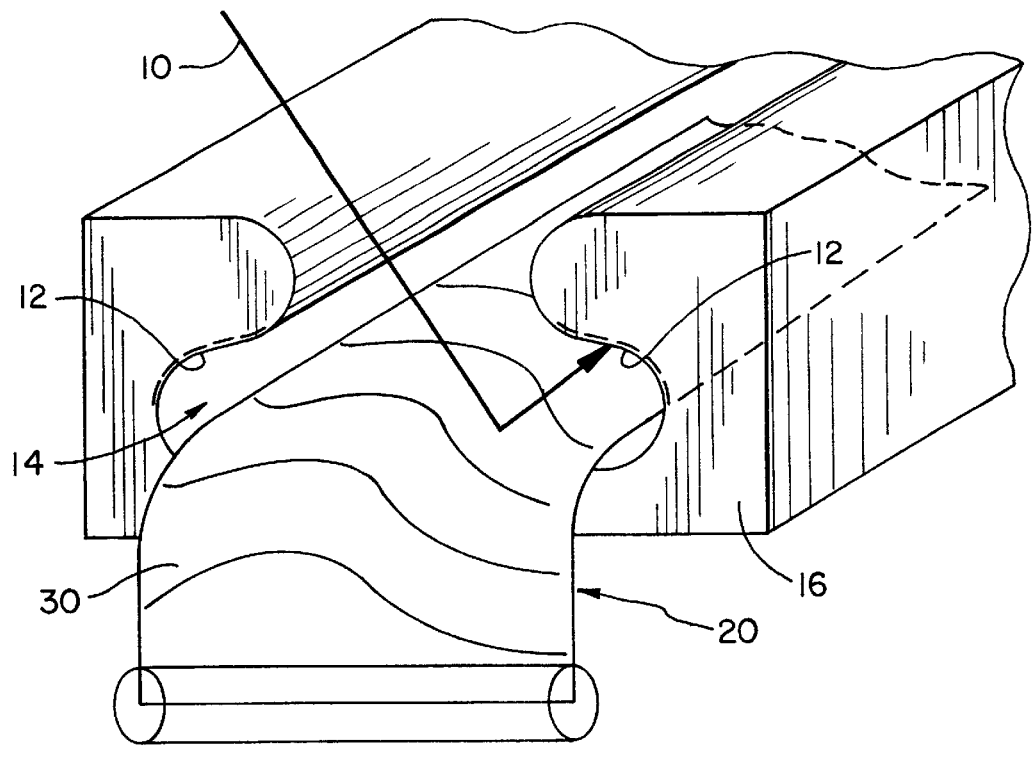
FIG. 4 is a sectional diagrammatic view of one embodiment of the present invention showing a reflective foil used to focus the laser beam on the hidden surface.

FIG. 4 shows an alternate embodiment of reflective member 20, in that it comprises a reflective foil 30, able to be inserted into recess 14. Such reflective foil could be made from silver or mica or other reflective tape or be comprised of a reflective coating applied to another type material and formed to direct laser beam 10 to a desired area of hidden surface 12. The tape or foil could be indexed over a formed surface or an insert, such as shown in FIG. 3, to provide a renewable reflecting surface.

Figure 5:
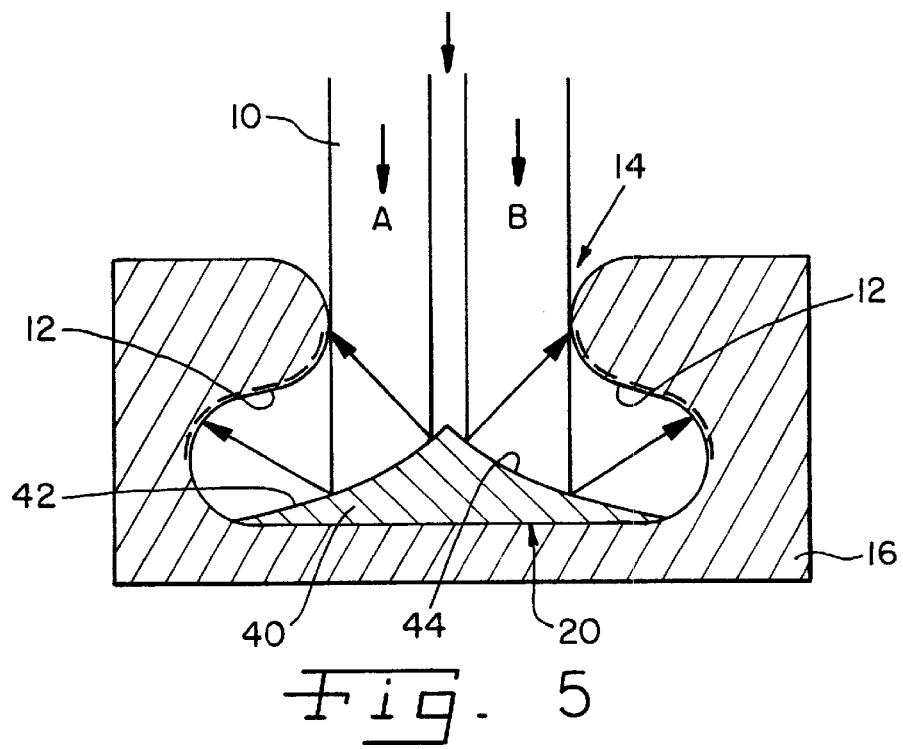
FIG. 5 is another embodiment of the present invention using formed reflective member capable of splitting the incoming laser beam so as to process two hidden surfaces with one laser beam.

FIG. 5 shows an other alternate embodiment in which reflective member 20 is a roof-shaped reflector 40 having two or more reflecting portions 42 and 44. These portions enable a single beam 10 to be applied to more than a single hidden surface 12. Once again the specific angles of portions 42 and 44 would depend on the geometry of recess 14 and the location of hidden surfaces 12.

Another novel feature shown in FIG. 5 is that of utilizing a larger laser beam 10 encompassing a majority of the opening of recess 14. The inventors have discovered that by utilizing as much of the entrance opening of recess 14 as possible for the beam path, the applied energy density at the reflector member 20 or reflective surface on inner surface 26 is at its lowest. This lowering of the energy density increases the operational efficiency and lifespan of the reflective member 20 or surface 26. Such reduction of laser energy is not noticeable at the laser worked surfaces on hidden surfaces 12 since the laser beam 10 is focused back to an operational power density at the workpiece surface by the reflective member 20 or surface 26.

Figure 6A:
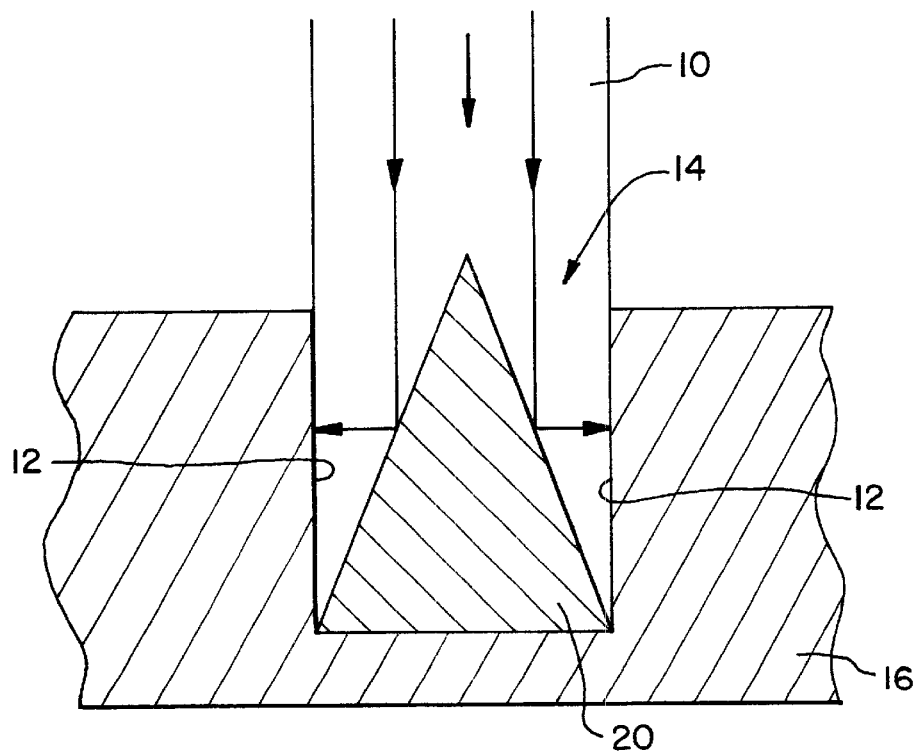
FIG. 6a is another embodiment of the present invention using reflective member having a cone shaped cross section for processing the hidden surface forming the edges of a bore or hole in which the reflective member directs a non-uniform energy density to the hidden surface.

FIG. 6a shows another configuration of reflective member 20, that of a substantially cone-shaped piece interfit into recess 14 (more specifically a bore or opening within workpiece 16). In this case, recess 14 is defined by hidden surface 12. Application of laser energy is supplied by laser beam 10 passing down recess 14, reflecting off of member 20 and thereby impacting hidden surface 12. In this embodiment, laser shock peening occurs simultaneously about the entire hidden surface 12. Using a cone form of the reflective member, as depicted in FIG. 6a, may result in non-uniform processing because the upper portions of the hidden surface will receive a lower energy density than will the lower surfaces of the hidden surface.

Figure 6B:
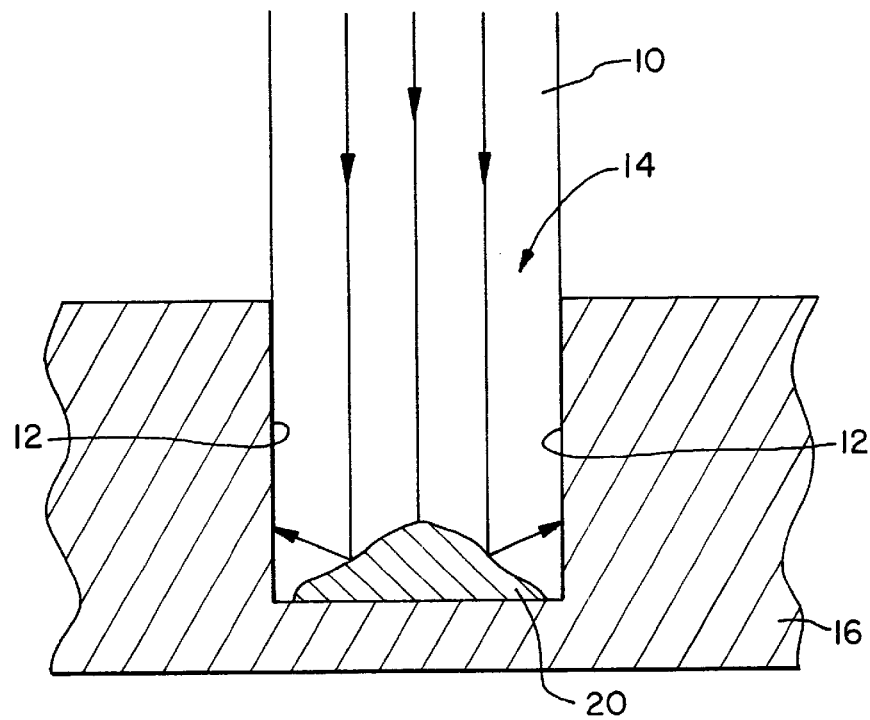
FIG. 6b is the same hidden surface as 6a with a double curvature reflective member disposed within the recess to direct a substantially uniform energy density to the hidden surface.

Referring to FIG. 6b, a special contour for the reflective member 20 can be designed to provide a substantially uniform energy density on the hidden surface 12. To accommodate the hidden surface depicted, the reflective member's shape will have a double curvature, which concentrates the center portions of the beam and diverges the outer portions of the beam. An analytical solution of the mirror surface curve can be derived from simple optical theory for a perfect cylindrical bore surface or a numerical derivation of the surface can be obtained in the general case of a non-cylindrical surface by a finite element method. The curves so derived would be unique to each workpiece configuration and would account for the size of the incident beam, the size of the opening in the workpiece, the curvature of the surface to be processed, the distance of the surface to be processed from the reflective member, and the azimuthal symmetry of the processing geometry. The derivation procedure consists of mapping the energy incident on finite element segments of a trial mirror surface to finite element segments on the workpiece surface. Mirror segment widths and inclination angles are chosen to produce substantially uniform energy density on the workpiece surface segments accounting for workpiece surface segment distance from the reflector member, reflector member radial location in the beam, and reflector member and inclination angle. The reflective member curve is then set by taking smaller and smaller finite element segment sizes or fitting the center locations of the segments to a smooth curve by interpolation or both.

Figure 7:
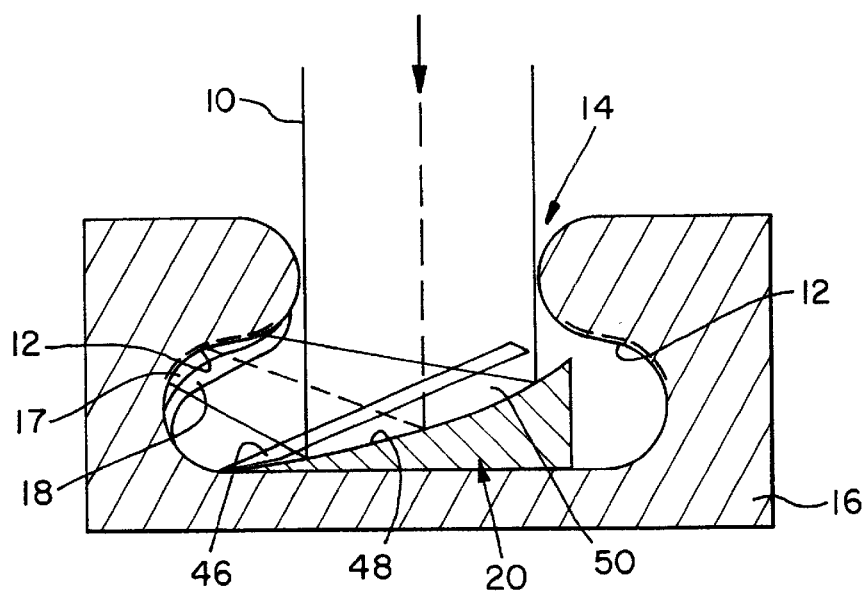
FIG. 7 is a sectional view of a workpiece having a reflective element disposed within the recess focussing an incoming laser beam to the hidden surface depicting one embodiment of the means for preventing damage to the reflective member.

FIG. 7 shows yet another configuration of the invention. Transparent shield 46 is located between reflective member 20 and hidden surface 12. Transparent shield 46 is but one means by which the present invention reduces damage to the reflective member. Transparent shield 46 provides a gap between reflective member 20 and transparent overlay 18. The result of gap 50 is to prevent reflective member surface 48 from coming into contact with transparent overlay 18. When a surface does not contain a transparent overlay, the result is a ten fold decrease in plasma pressure on a surface. A recitation of the effects of plasma formation in the absence of a transparent overlay can be found in the article, Walters, *Laser Generation of 100-kbar Shock Waves in Solids*, Shock Compression of Condensed Matters, 797 (1991).

While FIG. 7 depicts gap 50 as a physical gap between reflective surface 48 and transparent shield 46, shield 46 may be in actual contact with reflective surface 48 and the gap can simply be the width of the transparent shield 46. Transparent shield 46 can be composed of any suitable transparent material which may include glass or plastic film material.

Figure 8:
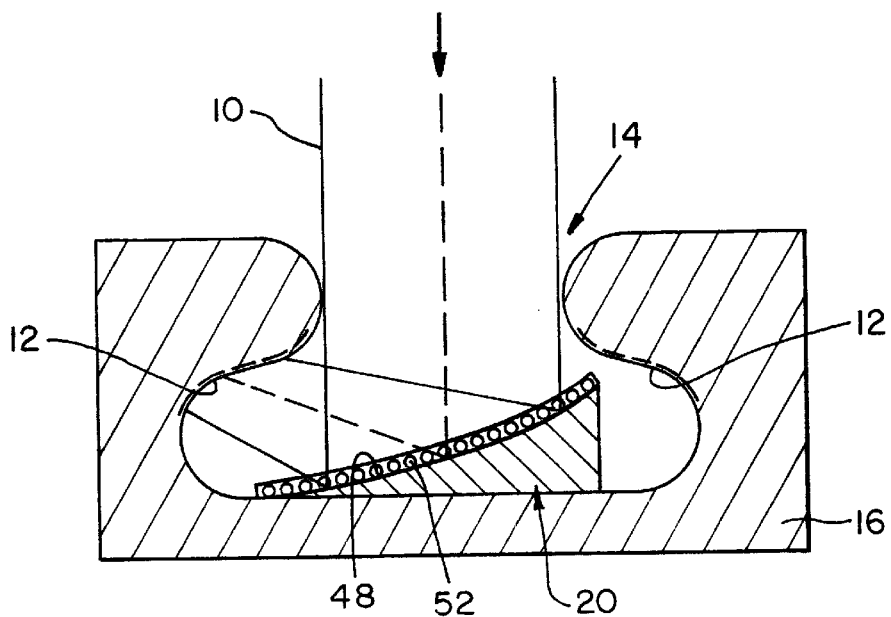
FIG. 8 is a sectional view of a workpiece having a reflective element disposed within the recess focussing an incoming laser beam to the hidden surface depicting another embodiment of the means for preventing damage to the reflective member.

In an alternate embodiment, transparent shield 46 may be composed of a composite design such as bubble wrap 52, as depicted in FIG. 8. Bubble wrap 52 is composed of plastic which is transparent to the laser beam 10.

Another means of preventing damage to reflective member 20 is to control and reduce the energy density applied to reflective member 20. A minimal energy density is directed to the surface 48 of reflective member 20. Reflective member 20 is shaped to act as a focusing mirror 52. Focusing mirror 52 focuses a beam of coherent energy to hidden surface 12. In focusing a beam of coherent energy from laser beam 10, focusing mirror 52 increases the energy density so that there is a maximum or operational energy density applied to hidden surface 12.

During laser shock peening, it is preferable, in order to minimize possible damage to reflective member 20, for the minimal energy density on the reflector surface to be between 5 joules/cm$^2$ to 20 joules/cm$^2$ and preferably around 5 joules/cm$^2$. In terms of power, it is preferable to keep the power around or below 1 gigawatt/cm$^2$. Using the energy and power ranges above, damage to reflective member 20 is minimized.

Focusing mirror 52 increases the gain or energy density of laser beam 10 from a minimum energy density of between 5 to 20 joules/cm$^2$ to a maximum energy density of around 200 joules/cm$^2$. For effective laser shock processing, it is optimal to have an energy density around 50 to 200 joules/cm$^2$. However, if one were to apply 200 joules/cm$^2$ to reflective member surface 48, the energy would destroy or severely damage a reflective member. By applying a minimum energy density to reflective member surface 48, one is able to effectively laser shock process a hidden 48, one is able to effectively laser shock process a hidden surface 12 without damaging or, at the least, greatly limiting any possible damage to reflective member 20.

Figure 9:
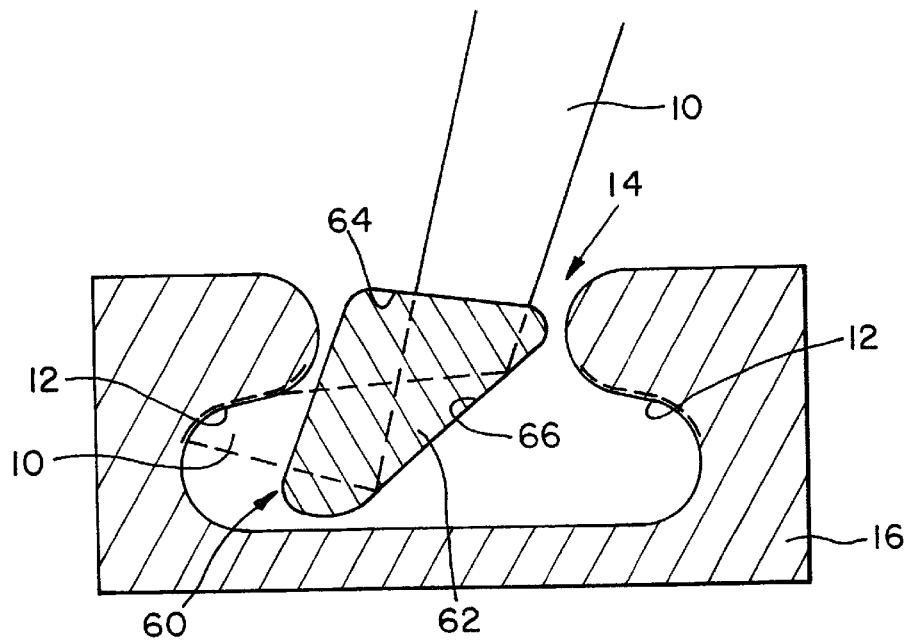
FIG. 9 is a sectional view of a workpiece having a fluid reflective member disposed within the recess focusing an incoming laser beam to the hidden surface.

FIG. 9 shows another configuration of the invention. Reflective member 60 consists of a liquid stream or flow of fluid 62, that flows along a fluid flow axis which is along the length of the recess in workpiece 16. The cross-section of the fluid flow 62 is substantially similar to that of a right angle prism. The laser beam 10 enters the fluid flow near normal (transverse to the fluid flow axis) to incident surface 64 of the cross-section and is reflected by total internal reflection by the reflective surface 66. The incidence angle created between the laser beam 10 and normal to the reflective surface 66 is the angle of incidence θ. The laser beam 10 then exits the fluid flow and is incident on the hidden surface 12 to be processed. When air surrounds the reflective member 60, the fluid must have an index of refraction greater than about 1.2 for accessing hidden surfaces, and a value greater than 1.3 is preferred.

Water has an index of 1.33 and is a preferred fluid. The preferred fluid should be substantially transparent to a pulse of coherent energy. The shape of the fluid flow cross-section is controlled by the shape of the flow orifice, surface tension, and the fluid flow speed. While water is disclosed here as the preferred fluid, other fluids may be used. For example, other fluids with indices of refraction suitable include acetone, ethyl alcohol, sugar solutions, glycerol, and various oils.

In order to achieve total internal reflection, the angle of laser beam 10 relative to reflective surface 66 must be greater than critical angle $\theta_c$. θ is the angle measured between an axis normal to reflective surface 66 and the axis of the incoming laser beam 10. For example, if laser beam 10 is normal to reflective surface 66, incident angle θ is zero. When angle of incidence θ is zero, there will no deviation of a laser beam. The angle of incidence (θ) must be greater than $\theta_c$=48.8 degrees to achieve total internal reflection in water with air environment. The angle of incidence θ must be greater than the well-known critical angle for total internal reflection defined by sin $\theta_c$=1/n, where n is the refractive index of the fluid.

While reflective member 60 is depicted as a shape similar to that of a right angle prism, the shape of the desired reflective member is determined by the shape of the workpiece to be processed, the fluid composition of the reflective member, and the angle of the laser beam relative to the fluid flow axis (angle of incidence θ). Therefore, other shapes, such as solid triangles, solid polygons, and other shaped prisms and structures may be utilized.

In one particular embodiment, a high-speed fluid nozzle (not shown) is used to produce the fluid flow of fluid 62. The shape of the cross-section of the fluid flow controls the uniformity of the energy density on the workpiece hidden surface 12. Special curves for the cross-section surfaces may be used to provide a substantially uniform energy density. These curves may be derived by finite element mapping and the simple optics laws of refraction and reflection. While FIG. 9 depicts hidden surface laser shock processing, reflective member 60 can be used to process non-hidden surfaces.

It is preferable that the flow of fluid 62 be a laminar flow. With a laminar flow, the fluid flow is streamlined, whereby enabling the flow of fluid to assume various shapes in three-dimensional space. The laminar flow can be produced by using a high speed flow nozzle, which consists of a plurality of tightly packed adjacent tubes or channels which form the desired shape of the flow of fluid necessary for producing a desired geometrically-shaped reflective member. When the fluid flows through the plurality of parallel tubes, the fluid is constrained to parallel stream lines and forms a laminar flow when expelled from the fluid nozzle.

Flow of fluid 62 may be recirculated (i.e., contained in a closed system) to be reused in reforming or maintaining the reflective member 60. The fluid may be filtered to remove any contaminants or particulate matter that could accumulate within the fluid. In addition, a suction or vacuum means may be used on the opposing side from the fluid nozzle to collect and remove the fluid flow from the workpiece processing area.

Figure 10:
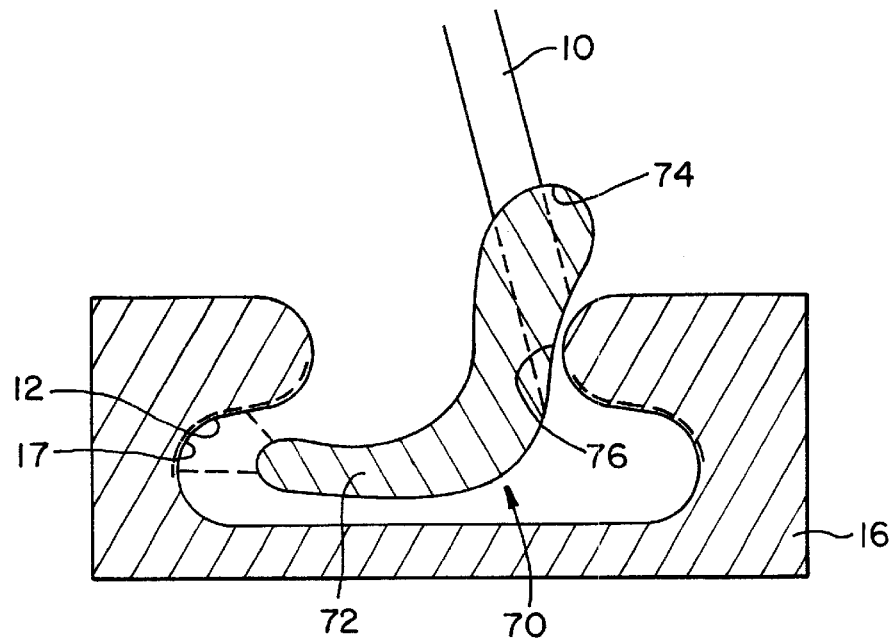
FIG. 10 is a sectional view of a workpiece having a fluid laser beam guide disposed within the recess to direct a laser beam to the hidden surface.

FIG. 10 shows another embodiment of the invention. Reflective member 70 consists of fluid laser beam guide 72. Fluid laser beam guide 72 is produced by a stream or jet of fluid which flows along the path of the recess in workpiece 16. The laser beam 10 enters the fluid laser beam guide 72 near normal to the incident surface 74. Laser beam 10 is reflected by total internal reflection by the reflective surface 76. Laser beam 10 then exits the fluid laser beam guide 72 and is incident on hidden surface 12 to be processed. The shape and geometry of fluid laser beam guide 72 directs a laser beam to a specific location on workpiece 16. The angle of incidence θ between laser beam 10 and reflective surface 76 must be greater than the $\theta_c$ of 48.8 degrees (which is the $\theta_c$ when the reflective member is composed of water and the surrounding environment is air) in order to get 100 percent total internal reflection.

Figure 11:
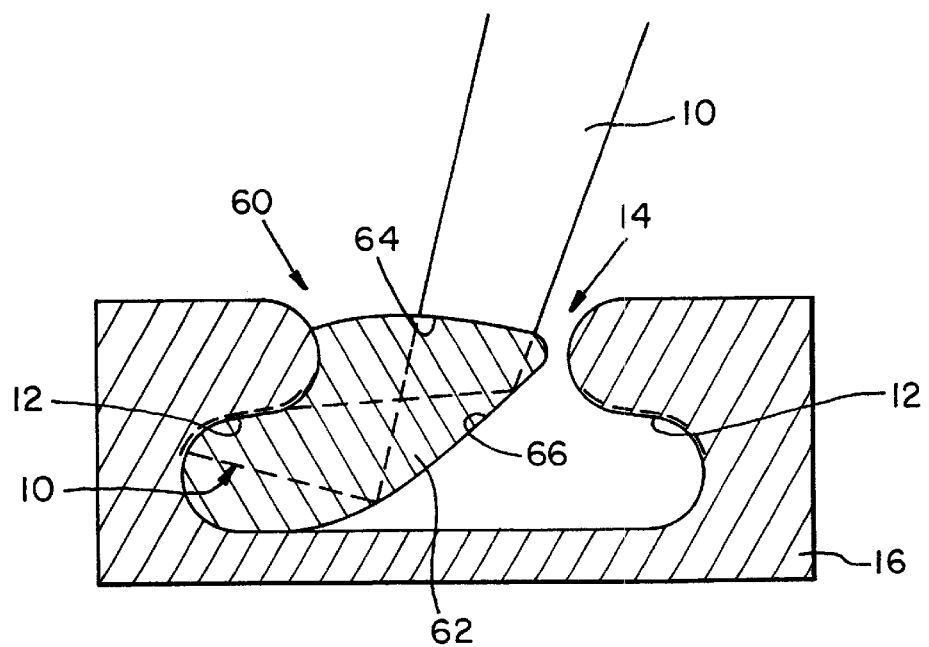
FIG. 11 is a sectional view of a workpiece having a fluid laser beam guide disposed within the recess to direct a laser beam to the hidden surface with the fluid laser beam guide contacting the hidden surface.

The embodiments depicted in FIGS. 9, 10, 11 show the angle of incidence θ as being greater than $\theta_c$, resulting in 100 percent internal reflection. However, it may be advantageous to have the angle of incidence θ being smaller or less than $\theta_c$. When the angle of incidence θ is less than $\theta_c$, a portion of the incident laser beam will be reflected and a portion will be refracted. The refracted portion would pass through the reflective member. In the embodiment shown in FIGS. 9 and 10, the refracted portion will impact the workpiece. Depending on the surface of the workpiece or if there is an additional reflective member located below the fluid reflective member, the refracted beam could be redirected to do work as desired.

In addition, the fluid reflective member can act as a beam splitter. As such, a beam of coherent energy may be split into multiple beams and used to do work as desired.

While FIG. 10 depicts fluid laser beam path 72 being used to direct a beam of coherent energy to hidden surface 12, fluid laser beam guide 72 may be used to direct a beam of coherent energy to any workpiece surface to be processed.

Referring now to FIG. 11, in one particular embodiment, the flow of fluid 62 acts as a transparent overlay. Reflective member 60 is in contact with workpiece 10 at the hidden surface 12. As a result, reflective member 60 acts as both a reflective member and as a transparent overlay.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser shock peening method for processing a hidden surface of a workpiece, the hidden surface disposed within a recess having an opening, the method comprising the steps of:
   inserting a reflective member into the recess;
   providing means for minimizing damage to the reflective member; and
   directing a pulse of coherent energy to reflect off of the reflective member and impact the hidden surface of the workpiece to create a shock wave therein.

2. The laser shock peening method of claim 1, wherein said step of providing means for preventing damage to the reflective member includes the step of filling a majority of the opening with the pulse.

3. The laser shock peening method of claim 1, further comprising:
   applying a substantially transparent overlay to the hidden surface; and
   means for minimizing damage to the reflective member comprises providing a gap between a transparent overlay and the reflective member.

4. The laser shock peening method of claim 1, in which the means for minimizing damage to the reflective member comprises locating a transparent shield between the reflective member and the hidden surface.

5. The laser shock peening method of claim 4, in which the transparent shield comprises moving fluid.

6. The laser shock peening method of claim 4, in which the transparent shield comprises a substantially transparent film.

7. The laser shock peening method of claim 1, in which the means for minimizing damage to said reflective member comprises providing the pulse of coherent energy at a substantially minimum energy density when reaching the reflective member and an operational energy density when the pulse impacts the workpiece.

8. The laser shock peening method of claim 1, in which the reflective member comprises a reflective coating applied to the workpiece.

9. The laser shock peening method of claim 1, in which the recess is dovetail shaped.

10. The laser shock peening method of claim 1, further comprising the step of forming the reflective member so as to permit directing a single pulse to at least two hidden surfaces.

11. The laser processing method of claim 1, further comprising the step of applying a sacrificial surface to the reflective member.

12. The laser shock peening method of claim 1, in which the reflective member is a focusing mirror.

13. The laser shock peening method of claim 12, further comprising the step of applying a sacrificial surface to said reflective member.

14. The laser shock peening method of claim 1, wherein the step of inserting a reflective member comprises the step of forming the reflective member from a fluid.

15. The laser shock peening method of claim 14, wherein the step of forming the reflective member comprises directing a flow of fluid from a high-speed nozzle to shape the reflective member.

16. The laser shock peening method of claim 14, wherein the fluid has a minimum index of refraction of about 1.2.

17. The laser shock peening method of claim 1 wherein the step of providing means for preventing damage to the reflective member comprises preventing plasma formation on a surface of the reflective member.

18. The laser shock peening method of claim 1, in which the reflective member is at least 50 percent reflective after the step of directing a laser pulse to reflect off of the reflective member.

19. The laser shock peening method of claim 1, in which the pulse of coherent energy is at least 10 joules.

20. The laser shock peening method of claim 1, in which the pulse of coherent energy is less than 100 nanoseconds in duration.

21. A laser shock peening method for processing a hidden surface of a workpiece, the hidden surface disposed within a recess having an opening, the method comprising the steps of:
   inserting a reflective member having a geometry into the recess;
   determining the reflective member geometry such that when a pulse of coherent energy reflects off the reflective member, the pulse will impact the workpiece surface with a substantially uniform energy density being applied to the workpiece surface; and
   directing a pulse of coherent energy to reflect off of the reflective member and impact the hidden surface of workpiece to create a shock wave therein.

22. The laser shock peening method of claim 21, in which the hidden surface has a contour.

23. The laser shock peening method of claim 21, in which the recess is dovetail shaped.

24. The laser shock peening method of claim 21, in which the reflective member comprises a reflective coating applied to the work piece.

25. The laser shock peening method of claim 21, wherein the step of determining the geometry of the reflective member further comprising the step of forming the reflective member so as to permit directing a single pulse to at least two hidden surfaces.

26. The laser shock peening method of claim 21, further comprising the step of applying a sacrificial surface to the reflective member.

27. The laser shock peening method of claim 21, wherein said step of directing the pulse of coherent energy includes the step of filling a majority of the opening with said pulse.

28. The laser shock peening method of claim 21, wherein the step of inserting a reflective member comprises the step of forming the reflective member from a fluid.

29. The laser shock peening method of claim 28, wherein the step of forming the reflective member comprises directing a flow of fluid from a high-speed nozzle to shape the reflective member.

30. A laser shock peening method for processing a workpiece comprising the steps:

forming a reflective member from a fluid; and directing a pulse of coherent energy to reflect off of the reflective member and impact the workpiece to create compressive residual stresses, therein.

31. The laser shock peening method according to claim 30, wherein the step of forming the reflective member comprises directing a flow of fluid from a high-speed nozzle to shape the reflective member.

32. The laser shock peening method according to claim 30, wherein the step of forming the reflective member comprises the step of forming the reflective member into a fluid laser beam guide.

33. A laser peening apparatus for improving properties of a workpiece by providing shock waves therein, comprising:

an overlay material, said material being applied to the workpiece;

a laser-pulse generator to generate a laser beam, said laser-pulse generator operatively associated with said overlay material to create a shock wave on the workpiece; and a reflective member composed of fluid, said reflective member operatively associated with said laser-pulse generator.

34. The laser peening apparatus according to claim 33, wherein said reflective member is formed by a high-speed fluid nozzle.

35. The laser peening apparatus according to claim 33, further comprising:

said reflective member is formed by flowing fluid having a fluid flow axis; and said laser beam proceeds along a laser beam path, said laser beam path is transverse to said fluid flow axis.

36. The laser peening apparatus according to claim 35, wherein said reflective member reflects a laser beam to the workpiece.

37. The laser peening apparatus according to claim 33, wherein said reflective member is a fluid laser beam guide.

38. The laser peening apparatus according to claim 37, wherein said fluid laser beam guide directs said laser beam to the work piece.

39. The laser peening apparatus according to claim 33, wherein said overlay material comprises an energy absorbing material.

40. The laser peening apparatus according to claim 33, wherein said overlay material comprises a transparent overlay material.

41. The laser peening apparatus according to claim 40, wherein said transparent overlay material is composed of said fluid of said reflective member.

42. A laser processing method for processing a hidden surface of a workpiece, the hidden surface disposed within a recess having an opening, the method comprising the steps of:

inserting a reflective member into the recess;

directing a pulse of coherent energy to reflect off of the reflective member and impact the hidden surface of the workpiece to create a shockwave; and indexing the reflective member to provide a renewable reflective surface.

43. The laser processing method of claim 42 wherein the reflective member comprises reflective film.

44. The laser processing method of claim 42 wherein the step of inserting a reflective member comprises the step of locating the reflective member over a formed surface.

45. The laser processing method of claim 44, wherein the reflective member comprises reflective film.

* * * * *